INVENTORS
ROBERT M. ASHBY
THEODORE J. LACHAPELLE
GORDON H. SMITH

L. Lee Humphries
ATTORNEY

INVENTORS
ROBERT M. ASHBY
THEODORE J. LACHAPELLE
GORDON H. SMITH

L. Lee Humphries

ATTORNEY

INTEGRATED CIRCUIT DIODE MATRIX

Filed May 2, 1966

4 Sheets-Sheet 3

INVENTORS
ROBERT M. ASHBY
THEODORE J. LACHAPELLE
GORDON H. SMITH
L. Lee Humphries
ATTORNEY INVENTORS
ROBERT M. ASHBY
THEODORE J. LACHAPELLE
GORDON H. SMITH
L. Lee Humphries
ATTORNEY United States Patent Office 3,377,513

Patented Apr. 9, 1968

3,377,513

INTEGRATED CIRCUIT DIODE MATRIX

Robert M. Ashby, Pasadena, Theodore J. La Chapelle, Orange, and Gordon H. Smith, Santa Ana, Calif., assignors to North American Rockwell Corporation, a corporation of Delaware Filed May 2, 1966, Ser. No. 546,959
10 Claims. (Cl. 317—101)

ABSTRACT OF THE DISCLOSURE

A microminiature integrated circuit diode matrix fabricated on a single crystal, electrically insulating substrate. A plurality of diode elements are disposed atop the substrate to form a high density array. A first set of electrical conductors also is disposed on the substrate, each conductor being electrically connected to one terminal of each diode in the corresponding row of the matrix. A second set of conductors, electrically insulated from the first set, crosses the first set. Each conductor of the second set is electrically connected to the second terminal of preselected ones of the diode elements in the corresponding column.

This invention relates to a microminiature diode array constructed on a dielectric substrate. More particularly, the invention relates to a microminiature diode array which can be used as a nondestructive memory having extremely high storage density and access speed. In addition, the invention provides a microminiature circuit component for applications where a large number of diode logic elements are required.

The invention is well suited for memory applications such as storage of mathematical tables, data lists, fixed computer programs, or vehicle trajectory information. As a memory, it exhibits the desirable features of large storage capacity, very high bit density and very fast access speed. In addition, it is light weight and has low power consumption, features particularly desirable for airborne application. The invention also is valuable as a circuit component in which large numbers of diode elements are available. As such, it lends itself to performing code translation or multiple simultaneous logic operations.

Previous memory devices were of several major types. Ferrite core memories require high switching currents even for read-only operation, and have maximum packaging densities, in one plane, of about 1,000 bits per square inch. Data storage comprised of capacitive or inductance elements have been used, but packaging densities of greater than several hundred bits per square inch do not seem practical for these devices. Moreover, their inherent capacitance or inductance places a severe restriction on the maximum access speeds obtainable with these devices. Thin magnetic metal film memories, while allowing packing densities up to about 1,000 per square inch, have quite low readout voltages, and resultantly, a low signal to noise ratio. Moreover diode memories, if constructed of discrete components, have costs which are prohibitively high.

Prior art common substrate diode arrays have inherent limitations of size and speed resulting from use of a semiconductor substrate material, usually silicon, and associated fabrication techniques which produced diode p-n junction areas of large size and, consequently, high interelectrode capacitance. Attempts to produce smaller diodes, and thus allow higher bit densities, resulted in structures which were mechanically weak. Moreover, sense/drive line capacitances of these arrays were high, a result of depositing the lines directly onto a semiconductor material, and using a relatively thin (typically 3,000 A.) layer of insulation material (typically $SiO_2$) to separate crossing sense/drive lines.

Therefore, it is an objective of the present invention to provide a microminiature diode array, on a common substrate, having a very high density of diode elements per unit area.

It is another objective of the present invention to provide a microminiature diode array having more than 5,000 diode elements per square inch.

It is another object of the present invention to provide a microminiature read-only memory having a density greater than 5,000 bits per square inch and having very high access speed.

An additional objective of the present invention is to provide a read-only memory plane having an access speed of less than one nanosecond.

A further objective of this invention is to provide a read-only memory plane having a signal to noise ratio of 1,000 or more.

It is another object of the present invention to provide a microminiature diode array capable of performing multiple logic functions as a component of a computer or other digital equipment.

It is another object of the present invention to provide a microminiature fixed diode array intraconnected to implement code translation or conversion.

It is yet another object of the present invention to provide a uniform memory structure capable of mass production and into which any set of data can be entered.

It is yet another object of the present invention to provide a microminiature diode array memory containing standard mathematical tables or data lists.

It is yet another object of the present invention to provide a microminiature diode matrix with built-in redundancy provided by having more than one diode at each matrix location.

It is yet another object of the present invention to provide a microminiature diode array having redundant rows or columns of diodes which can be utilized should a failure occur in a principal row or column.

It is still another objective of the present invention to provide a microminiature diode memory wherein the diode steering circuitry to address a particular memory location is continued on the same structure as the memory elements themselves.

The invention in its preferred form utilizes a dielectric substrate, optimally sapphire, on which a matrix array of vertical junction diode elements have been fabricated according to the method disclosed and taught in the copending application to Hagon, Serial No. 425,694, now abandoned, entitled, "Semiconductor Device and Method of Making," which shares the same assignee as the present case. These diode elements typically have p-n junction areas of less than 0.04 square mil, with an undoped region volume of less than 0.02 cubic mil. Using the Hagon fabrication process, packaging densities of greater than 5,000 such diode elements per square inch easily can be obtained, with average yields above 99 percent.

Two crossing sets of conductors are provided on the sapphire substrate, electrically isolated at their crossover points by a dielectric layer between 30,000 A. and 100,000 A. thick (optimally 70,000 A.), to serve as drive/sense lines for the diode array.

Further objects and features of the invention will become apparent from the following description and drawings which are utilized for illustrative purposes only.

Figure 1:
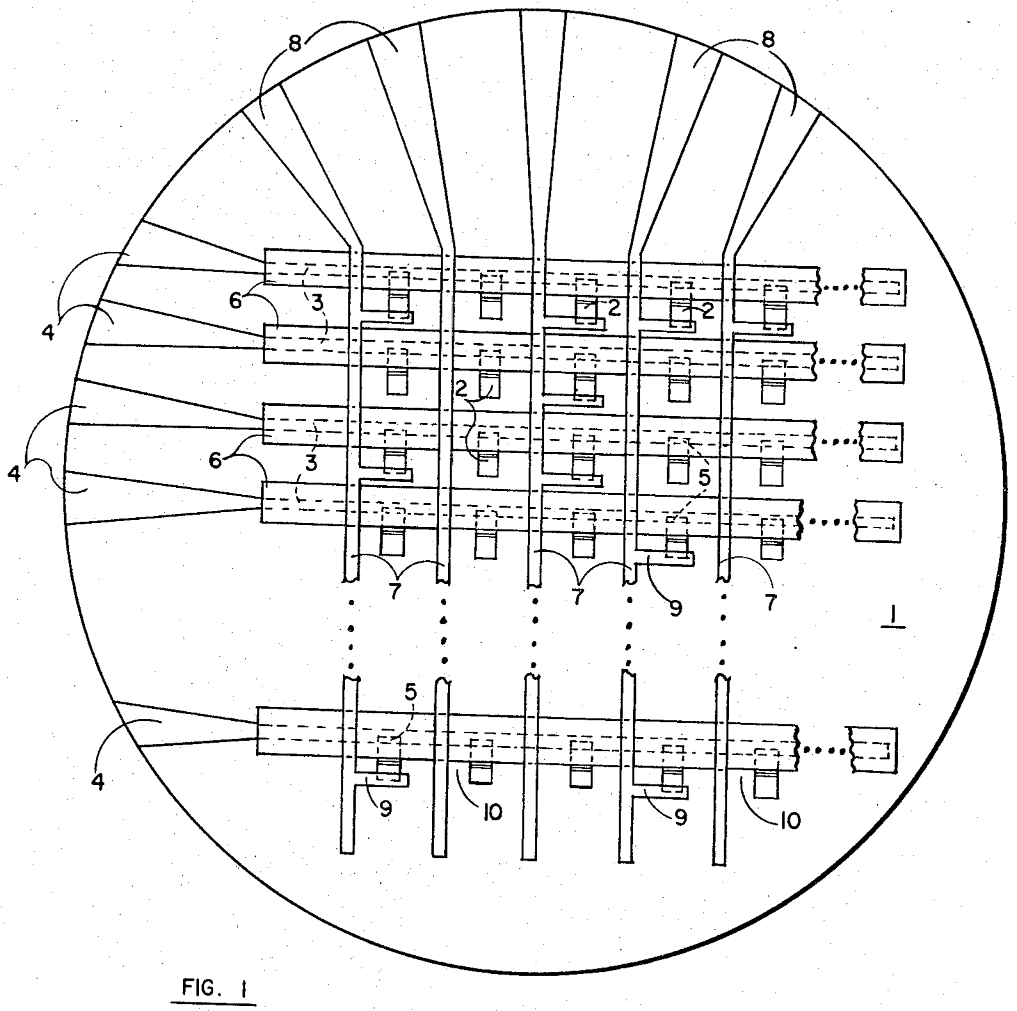
FIG. 1 is a top plan view of the microminiature diode array showing the general features of the invention.

Referring to FIG. 1, there is illustrated a microminiature diode array fabricated on a dielectric substrate 1, the preferred material for which is a single crystal refractory inorganic oxide such as sapphire, spinel, beryllium oxide, or zirconium oxide. These materials have the additional common properties of high dielectric strength, being able to withstand the high temperatures associated with common deposition and diffusion techniques, having sufficient hardness to permit polishing of their surface, being non-reactive to the usual chemicals used in processing a semiconductor deposit, and having a coefficient of expansion compatible with common semiconductor materials.

As shown in FIG. 1, fabricated on the dielectric substrate 1 are a plurality of diode elements 2 arranged to form a matrix. A first set of parallel conductors 3, in intimate contact with the dielectric substrate, terminates in a fan-out pattern 4 to provide enlarged contact area for interconnections with external circuitry. The conductors 3 should be positioned at an angle to the length of the diode elements 2 and should electrically contact one end of each diode element in the associated row of the matrix, as shown at 5.

The parallel conductors 3 may be vapor deposited through a metal mask onto the dielectric substrate. Conductors composed of a 400 A. to 600 A. thickness of titanium or chromium flash (for good adherence to the sapphire substrate), covered by 3,000 A. to 10,000 A. thickness of gold or aluminum and a final flash of 500 A. to 700 A. of titanium or chromium, have been found to work well for this application. For small matrices, e.g., 26 x 26 diode elements in an area 1/16 square inch or approximately 10,000 bits per square inch), individual conductor widths of 2 mils are appropriate. For higher packing densities, this width could be reduced to below 1 mil.

Referring still to FIG. 1, each of the conductors 3 is covered with a dielectric insulating layer 6, which has a thickness between 30,000 A. and 100,000 A. (optimally 70,000 A.) and a width approximately twice that of the conductor it covers. The dielectric insulating layer preferably is vapor deposited SiO, but also can be MgO, BeO, $Al_2O_3$, $TiO_2$, $SiO_2$ or $Si_3N_4$, all of which are high melting point insulating oxides or nitrides capable of deposition into vitreous films of good dielectric strength. (If silicon dioxide is utilized, then to obtain the desired thickness, it is usually deposited from a chemical vapor rather than using a vacuum evaporation technique common to the other materials mentioned.) By depositing this material through a metal mask held some distance from the surface of the substrate, tapered edges can be obtained. Widely separated multiple evaporation sources also help produce such bevelled edges with these masks. While FIG. 1 shows the dielectric insulating layer 6 covering essentially the entire length of each conductor 3, it is necessary only that it cover the conductors 3 at the places where they are crossed by conductors 7.

A second set of parallel conductors 7, terminating in a fanout pattern 8, next is disposed on the diode array structure so as to cross the first set of conductors 3. These conductors 7 also may be vapor deposited gold or aluminum (3,000 A. to 10,000 A. thick) over titanium flash (500 A. to 700 A.).

Each conductor 7 is selectively electrically connected (as at 9) or not connected (as at 10) to each diode element 2 in the corresponding column of the matrix depending on whether or not a diode intraconnection is desired at that matrix location. These connections 9 can be made during the deposition of the conductors 7 using a mask which has openings corresponding to the locations where connections 9 are to be made. Alternately, the same result can be obtained by initially depositing connections 9 at all matrix locations, then etching away the connections 9 at matrix locations where these are not desired. Either mask approach is desirable when a large number of arrays containing the same information is to be made, e.g., when memories containing standard mathematical tables or data lists are being fabricated, or when the diode arrays are designed to perform common logic functions or code translation.

An alternate approach to fabricating the connections 9 involves initial deposition of the entire set of conductors 7 with no diode interconnections 9 whatever. Then, in a subsequent operation, the desired connections 9 are vapor deposited through a separate mask having deposition openings corresponding to data (i.e., diode interconnections) specified by the individual user. This approach allows mass production of the basic diode array; only the final step of making the interconnections 9 is a custom, user dependent, operation.

Figure 2:
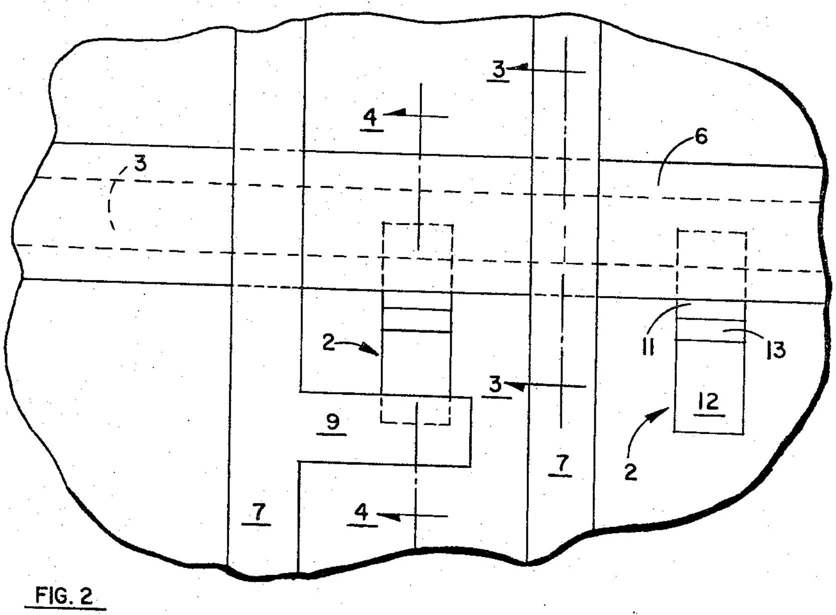
FIG. 2 is an enlarged fragmentary top plan view of a portion of the microminiature diode array, showing two typical diode elements.

FIG. 2 shows an enlarged fragmentary view of part of the microminiature diode array depicted in FIG. 1. Two typical diode elements 2 are shown in FIG. 2, one of which is electrically connected to its associated conductor 7 by connection 9 (indicating, e.g., the storage of a binary 1 at this matrix location), the other is not so connected (indicating, e.g., the storage of a binary 0).

Certain details of the diode elements 2 are evident in FIG. 2. Each diode element has three principal regions, a P+ area 11, an N+ area 12, and an undoped area 13 of *n* type material. The junction cross-sectional area of such a diode element fabricated by the Hagon process typically is less than 0.04 square mil, and the width of the undoped region 13 typically is less than 0.5 mil. Thus, the active semiconductor region of the diode element 2 has a volume of less than 0.02 cubic mil.

While the P+ region of diode element 2 is shown connected to conductor 3 in FIG. 2, this is not a requirement of the invention. The N+ region could just as well be connected to conductor 3.

Figure 3:
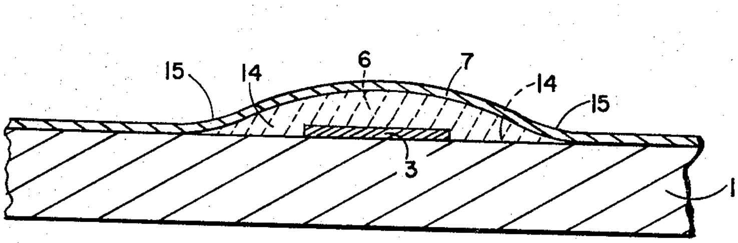
FIG. 3 is a sectional view along line 3—3 of FIG. 2.
Figure 4:
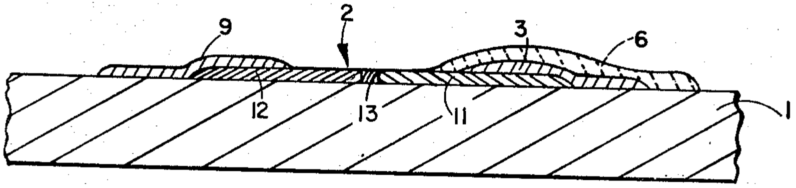
FIG. 4 is a sectional view along line 4—4 of FIG. 2.

FIG. 3, a sectional view along the line 3—3 of FIG. 2, shows in detail a typical crossover point between conductor 3 (a member of the first set of parallel conductors) and conductor 7 (one of the second set of parallel conductors). The tapered edges 14 of the dielectric insulating layer 6 are clearly evident in this figure; these tapered edges result in conductor 7 having gradually tapered bends 15. Were the edges of the dielectric insulating layer not tapered, then conductor 7 would have right angle bends which would result in lower reliability of these vapor deposited conductors 7. Tapered edges are also developed on all semiconductor island edges for the same reason, as illustrated in FIG. 4, and as practiced in the Hagon fabrication process. It should also be noted in FIG. 3 that conductor 3 is in intimate contact with the dielectric substrate 1.

FIG. 4, a sectional view along line 4—4 of FIG. 2, shows in detail the diode intraconnections. In particular, note that conductor 3 is deposited so as to be in direct contact with one terminal region 11 of diode element 2. In the depicted embodiment, the dielectric insulating layer 6 covers conductor 3 for its entire length, hence it is evident in FIG. 4. However, as noted earlier, this dielectric insulating layer need only cover conductor 3 at the crossover points with conductor 7.

FIG. 4 also shows diode element 2 connected at its second terminal region 12 to intraconnection 9. This would be the configuration were, e.g., a binary 1 to be stored at this matrix location. If a diode intraconnection were not desired at this matrix position, connection 9 would not be attached to diode element 2.

Figure 5:
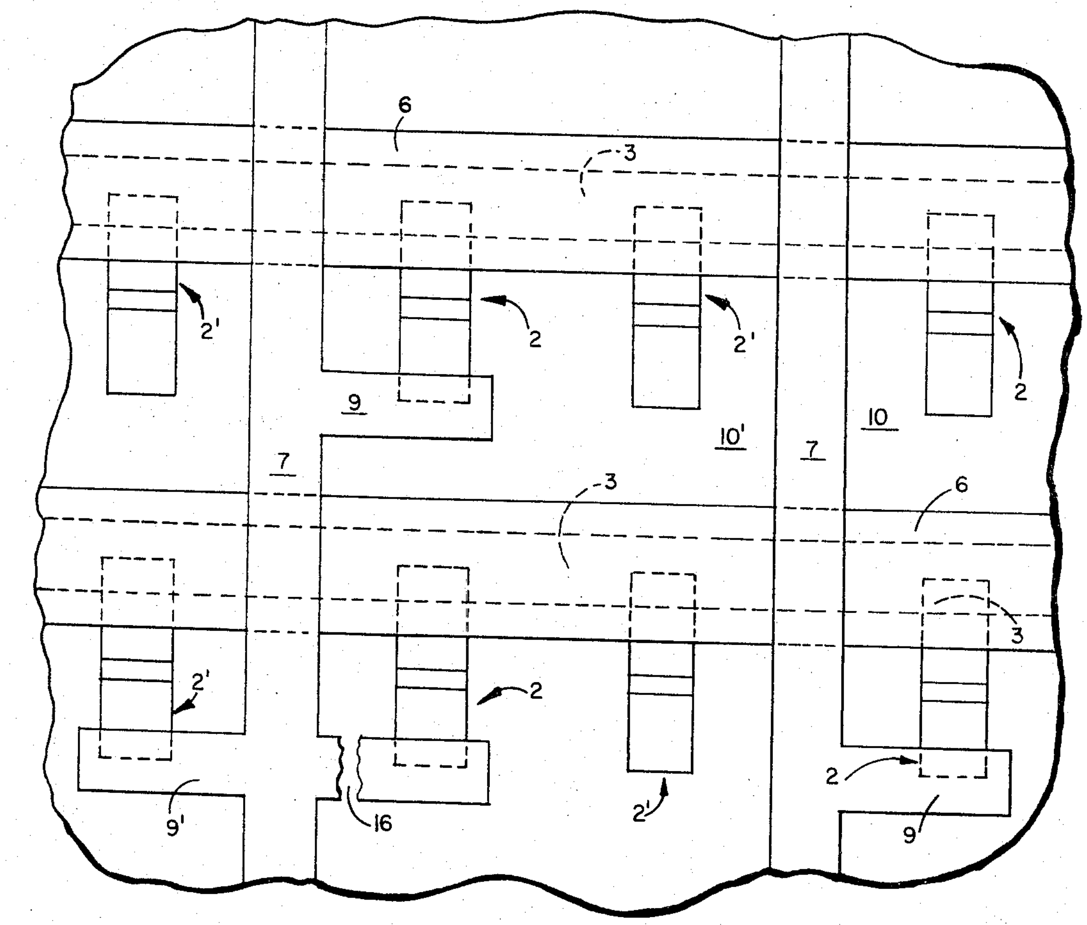
FIG. 5 is an enlarged fragmentary top plan view of a portion of an embodiment of the microminiature diode array having redundant diode elements at each matrix location.

FIG. 5 is an enlarged fragmentary view of an embodiment of the microminiature diode array having two identical diode elements, 2 and 2', at each matrix location. In this embodiment, as in the basic diode array, each of the first set of conductors 3 is electrically connected to each diode element 2, and also to each redundant diode element 2′ in the corresponding row of the matrix. At matrix locations where diode intraconnections are desired, electrical connections 9 are made to corresponding diode elements 2; however electrical connections are not made to corresponding redundant diode elements 2′. At matrix locations where such electrical intraconnections are not desired, no connections are made, either to the corresponding diode element 2 as indicated at 10, or to the redundant diode element 2′ as shown at 10′.

During fabrication, photoresist masking pinholes or dust particles may result in random defective diode elements. The redundant diode element embodiment of the invention, shown in FIG. 5 permits use of essentially 100 percent of the manufactured diode arrays, despite such random defective diode elements. To accomplish this, subsequent to fabrication, a test of each matrix intersection is performed to determine if any diode elements 2 are open or short-circuited. If a defective diode element 2 is discovered at a matrix location where a diode intraconnection is desired, the corresponding connection 9 is opened as at 16, thus electrically disconnecting diode element 2. A new intraconnection 9′ then is made to the redundant diode element 2′ at that matrix location. Note that if no diode intraconnection is desired at a particular matrix location, there is no need to verify whether or not the corresponding diode element 2 is defective.

The above described redundancy scheme has the disadvantage that it is relatively difficult to implement the connection 9′ to a redundant diode element 2′ when the associated diode element 2 has been found to be defective. An alternate embodiment of the microminiature diode array which provides redundancy yet eliminates the requirement for disconnecting and connecting individual diode element involves manufacturing the basic diode array with spare conductors 3 and spare rows of diode elements 2 connected to said spare conductors 3.

With this embodiment, when a defective diode element 2 is discovered, the entire row in which the defective diode element 2 is located is disconnected by open-circuiting the corresponding conductor 3 where it joins its fan-out 4. An electrical intraconnection then is made by connecting a jumper wire from the fan-out of the disconnected conductor to the fan-out of a spare conductor. This connection, which is relatively easy to accomplish, results in replacing the row containing the defective diode element 2 with an entire new, redundant row of diode elements. Note that this redundant row embodiment also simplifies the required diode array test procedure, since all of the diode elements 2 in an entire row can be tested simultaneously for short circuits. Moreover, if the fabrication technique used is the one in which all matrix locations originally have diode intraconnections made, which intraconnections subsequently are selectively disconnected, all of the diode elements 2 in an entire row also can be simultaneously tested for open circuits prior to the entry of data.

Figure 6:
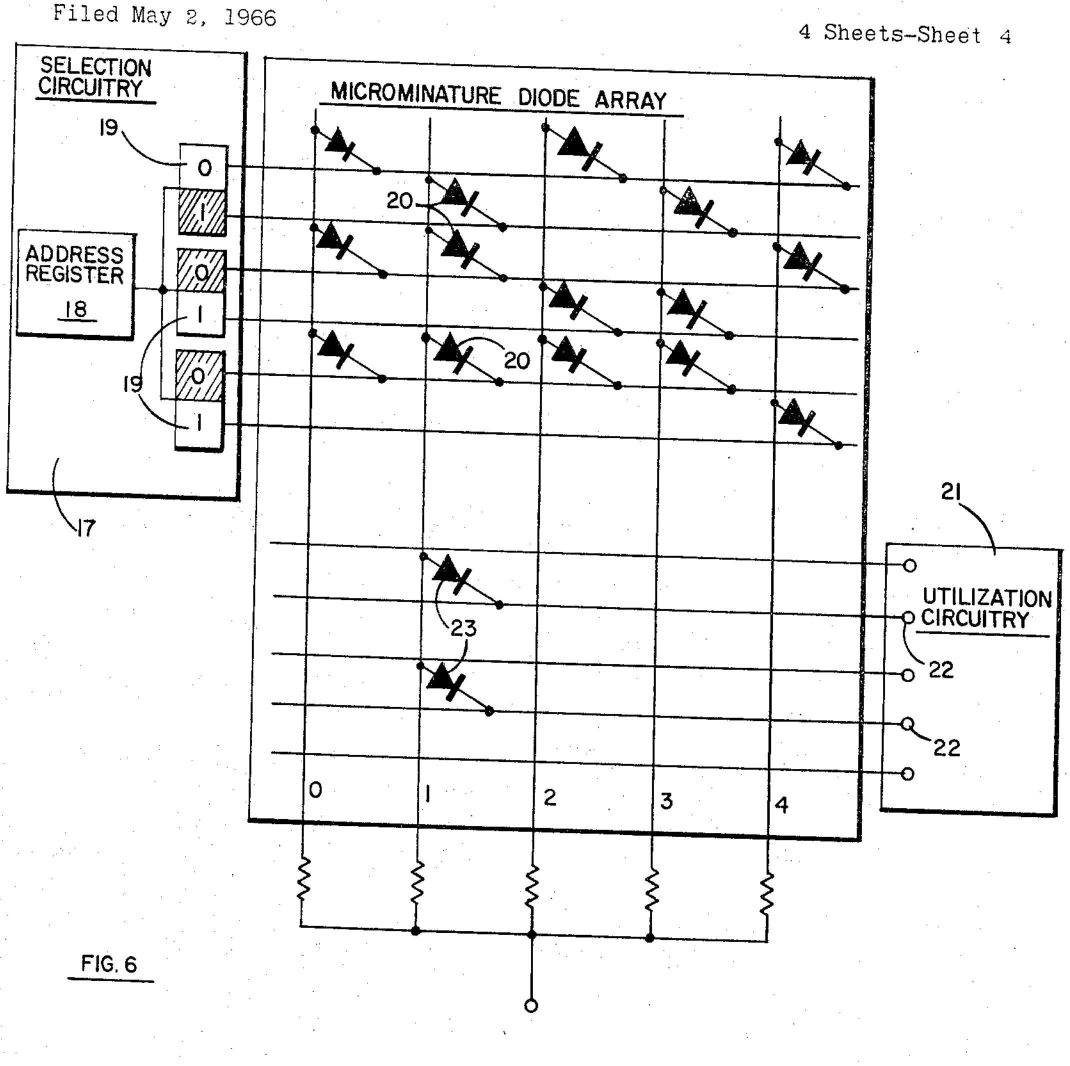
FIG. 6 is a schematic block diagram of a single microminiature diode array, part of which is used as a read-only memory, and part as a diode selection matrix for the memory.

FIG. 6 contains a simplified schematic diagram which illustrates how part of a single microminiature diode array can be used as a read-only memory, while another part of the same array serves as the diode selection matrix for addressing a particular column of memory locations. For this purpose, selection circuitry 17 provides appropriate input signals to the diode selection matrix. While it should be understood that any suitable circuitry may be used for this purpose FIG. 6 illustrates one example of such circuitry. Specifically, an address register 18 is used to set the states of a plurality of flip-flops 19 to correspond to a binary representation of the memory column to be addressed. (Note that address register 18 and flip-flops 19 are not a part of the present invention.)

The flip-flops 19 in turn drive the diode selection matrix portion of the microminiature diode array. As shown in the upper portion of the diode array schematically represented in FIG. 6, this selection matrix contains diode intraconnections which also correspond to a binary representation of the memory column to be addressed.

To illustrate how column selection is accomplished, assume that the column 1 drive line is being addressed. The flip-flops 19 are set to the states shown by the shading in FIG. 6, and as a result, selection matrix diodes 20 all become back biased. A signal voltage (on the order of a volt or more) then appears on the column 1 drive line, and outputs to appropriate utilization circuitry 21 (not part of this invention) appear on the sense lines 22 corresponding to the memory locations in column 1 at which diode intraconnections 23 have been made. The voltage level on all non-selected drive lines remains low (on the order of microvolts) since at least one selection matrix diode on each of these lines is forward biased.

It should be noted that the locations of diode intraconnection 23 in the memory portion of the microminiature diode array are completely random. That is, any data desired can be stored in the memory portion by making diode interconnections at the appropriate matrix location.

The foregoing discussion also illustrates another feature of this invention, specifically, that the microminiature diode array can be used to perform logic functions such as code translation. The diode selection matrix portion of the embodiment just described in effect is a code translator, converting a binary input (from the flip-flops) to a single line output corresponding to the selected column. Many other logic functions can be implemented with the invention.

Note that, when the microminiature diode array is used as a memory, the readout voltage is in the order of magnitude of a volt or more. This is significantly higher than the readout voltage of magnetic core memories, which is on the order of tens of millivolts, or of thin magnetic metal film memories, which is about 1 millivolt.

The subject invention also offers significant increases in effective speed of operation over prior art read-only memories. Specifically, the small p-n junction area of the diode elements used in the microminiature diode array typically have a capacitance less than 0.01 pf. Moreover, the drive/sense lines themselves have very low capacitance, partly as a result of their being disposed directly on a dielectric substrate, and partly because of the thickness of the insulating dielectric at the crossover points. For a 26 x 26 diode element matrix having a density of 10,000 bits per square inch, the total capacitance measured on a typical drive/sense line pair (including the diode element capacitances) is less than 2 pf. This low capacitance permits theoretical memory operating speeds of greater than 10 gc.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A microminiature diode array comprising a dielectric substrate, a plurality of diode elements disposed atop said substrate to form a high density matrix, a first set of conductors disposed on said substrate, each conductor being electrically connected to one terminal of each diode element in the corresponding row of the matrix, a second set of conductors crossing said first set, a dielectric insulating layer separating and electrically isolating the conductors of the second set from the conductors of the first set at their crossover points, with each conductor of said second set selectively electrically connected to the second terminal of preselected diode elements in the corresponding column.

2. A microminiature diode array as defined in claim 1 wherein the dielectric substrate is a single crystal material.

3. A microminiature diode array as defined in claim 1 wherein the dielectric substrate is selected from the group consisting of sapphire, spinel, BeO, and zirconium dioxide.

4. A microminiature diode array as defined in claim 1 wherein the dielectric insulating layer is selected from a group consisting of SiO, MgO, BeO, $Al_2O_3$, $TiO_2$, $SiO_2$, and $Si_3N_4$ and wherein said dielectric layer has a thickness between 30,000 A. and 100,000 A.

5. A microminiature diode array as defined in claim 1 wherein the diode elements each have a p-n junction area of less than 0.04 square mil.

6. A microminiature diode array as defined in claim 1 wherein the dielectric insulating layer is selected from a group consisting of SiO, MgO, BeO, $Al_2O_3$, $TiO_2$, $SiO_2$ and $Si_3N_4$, and wherein said dielectric layer has a thickness between 30,000 A. and 100,000 A., and wherein the diode elements each have a p-n junction area of less than 0.04 square mil.

7. A microminiature diode array as defined in claim 1 wherein the dielectric insulating layer is selected from a group consisting of SiO, MgO, BeO, $Al_2O_3$, $TiO_2$, $SiO_2$, and $Si_3N_4$, and wherein said dielectric layer has a thickness between 30,000 A. and 100,000 A., and wherein the diode elements each have a p-n junction area of less than 0.04 square mil, and wherein each of the active semiconductor regions of each diode element is disposed directly on the dielectric substrate.

8. A microminiature diode array comprising a sapphire substrate, a plurality of semiconductor diode elements disposed on said substrate to form a high density matrix, said diode elements each having an active semiconductor volume of less than 0.02 cubic mil, a first set of conductors in intimate contact with said substrate, each conductor being connected to one terminal of each diode element in the corresponding row of diodes, a second set of conductors crossing said first set, a dielectric insulating layer separating and electrically isolating the conductors of the second set from the conductors of the first set at their crossover points, said dielectric insulating layer selected from a group consising of SiO, MgO, $Al_2O_3$, $TiO_2$, $SiO_2$, and $Si_3N_4$, and said dielectric insulating layer having a thickness between 30,000 A. and 100,000 A., and wherein each conductor of said second set is electrically connected to the second terminal of preselected ones of said diode elements in the corresponding column.

9. A microminiature diode array with redundancy, comprising a dielectric substrate, a plurality of diode elements disposed on said substrate to form a high density matrix and with at least two such diode elements situated at each matrix location, a first set of conductors disposed on said substrate, each conductor being electrically connected to one terminal of each diode element in the corresponding row of the matrix, with said connections being made to like terminals of each redundant diode element at each matrix location, a second set of conductors crossing said first set, a dielectric insulating layer separating and electrically isolating the conductors of the second set from the conductors of the first set at their crossover points, with each conductor of said second set electrically connected to the second terminal of preselected ones of the redundant diode elements at each matrix location in the corresponding column.

10. A microminiature diode array as defined in claim 9 wherein the dielectric insulating layer is selected from a group consisting of SiO, MgO, BeO, $Al_2O_3$, $TiO_2$, $SiO_2$, and $Si_3N_4$, and wherein said dielectric layer has a thickness between 30,000 A. and 100,000 A., and wherein the diode elements each have a p-n junction area of less than 0.04 square mil.

References Cited

UNITED STATES PATENTS 3,128,332 4/1964 Burkig et al. ------ 29—577 XR
3,142,783 7/1964 Warren ------------ 317—101

ROBERT K. SCHAEFFER, *Primary Examiner.*

J. R. SCOTT, *Assistant Examiner.*